(12) United States Patent
Mortensen et al.

(10) Patent No.: US 7,813,598 B2
(45) Date of Patent: Oct. 12, 2010

(54) DEVICE INCLUDING A SYSTEM ADAPTED FOR USE IN TEMPERATURE COMPENSATION OF STRAIN MEASUREMENTS IN FIBRE-REINFORCED STRUCTURES

(75) Inventors: Ivan Engmark Mortensen, Kolding (DK); Tage Svendsen, Vejen (DK); Andrew Munro Gallon, Hampshire (GB)

(73) Assignee: LM Glasfiber A/S, Lunderskov (DK)

( * ) Notice: Subject to any disclaimer, the term of this patent is extended or adjusted under 35 U.S.C. 154(b) by 295 days.

(21) Appl. No.: 10/586,547

(22) PCT Filed: Jan. 20, 2005

(86) PCT No.: PCT/DK2005/000031

§ 371 (c)(1),
(2), (4) Date: Sep. 24, 2007

(87) PCT Pub. No.: WO2005/071312

PCT Pub. Date: Aug. 4, 2005

(65) Prior Publication Data

US 2008/0279499 A1    Nov. 13, 2008

(30) Foreign Application Priority Data

Jan. 23, 2004    (DK) ............................... 2004 00093

(51) Int. Cl.
*G02B 6/00* (2006.01)
(52) U.S. Cl. ...................................................... 385/12
(58) Field of Classification Search ................... 385/12, 385/13, 32
See application file for complete search history.

(56) References Cited

U.S. PATENT DOCUMENTS

| | | | |
|---|---|---|---|
| 5,094,527 A | 3/1992 | Martin | |
| 5,196,694 A | 3/1993 | Berthold et al. | |
| 5,381,005 A | 1/1995 | Chazelas et al. | |
| 5,533,165 A | 7/1996 | Burris et al. | |
| 5,649,035 A | 7/1997 | Zimmerman et al. | |
| 5,726,744 A | 3/1998 | Ferdinand et al. | |
| 5,887,107 A | 3/1999 | Newman et al. | |
| 6,384,404 B1 | 5/2002 | Berg | |
| 6,547,448 B2 * | 4/2003 | Johnson et al. ............... | 385/70 |
| 6,586,722 B1 * | 7/2003 | Kenny et al. ........... | 250/227.16 |
| 6,940,186 B2 * | 9/2005 | Weitkamp .................... | 290/44 |

FOREIGN PATENT DOCUMENTS

CN         1303009 A  *  7/2001

(Continued)

*Primary Examiner*—Charlie Peng
(74) *Attorney, Agent, or Firm*—Day Pitney LLP (57) ABSTRACT

The present invention relates to a device comprising a fiber-reinforced part and including at least one system comprising at least one optical fiber as well as connecting means adapted for connection of light emitting means and light receiving means to the optical fiber, said optical fiber comprising a number of reflecting structures. One object of the invention is to provide means suitable for use in providing compensation for temperature change in strain measurement, which may be built into fiber-reinforced parts of a device. This is obtained by having holding means adapted to hold one or more loops formed on the optical fibre, in a way where at least one loop may substantially freely change length when subject to a change in temperature.

23 Claims, 7 Drawing Sheets

| | FOREIGN PATENT DOCUMENTS | | |
|---|---|---|---|
| EP | 0 892 244 A2 | 1/1999 |
| EP | 0 892 244 A3 | 1/1999 |
| EP | 1 124 112 | 3/2001 |
| GB | 2196 735 | 5/1988 |
| WO | WO 97/15805 | 5/1997 |

* cited by examiner

DEVICE INCLUDING A SYSTEM ADAPTED FOR USE IN TEMPERATURE COMPENSATION OF STRAIN MEASUREMENTS IN FIBRE-REINFORCED STRUCTURES

The present invention relates to a device comprising a fibre-reinforced part and including at least one system adapted for use in temperature compensation of strain measurements; said system comprising at least one optical fibre as well as connecting means adapted for connection of light emitting means and light receiving means to the optical fibre, said optical fibre comprising a number of reflecting structures. The invention further relates to a method of manufacturing a device as well as to connecting means and holding means.

Different types of devices for use when measuring strain in structural elements are known, e.g. foils provided with a metallic layer forming a predetermined path adapted for electrical measurement and optical fibres provided with Bragg gratings for optical measurement. The latter being a strain sensor comprising an optical waveguide having a plurality of reflecting structures, so-called Bragg gratings, along its length. Such devices are commonly denominated "strain gauges" and are provided on structures to measure actual strain in the structure. In case the strain gauge is subject to a change in temperature, this will affect the measurement due to natural elongation or contraction. To have an accurate measurement it is therefore necessary to compensate the strain measurement with respect to change of temperature. Various methods have been used to provide compensation for temperature change, but none suitable for fibre-reinforced parts.

One object of the invention is to provide means suitable for use in providing compensation for temperature change in strain measurement, which may be built into a fibre-reinforced part of a device. Another object is to provide a method of manufacturing such a device where said means are built into a fibre-reinforced part.

Further objects appear from the description elsewhere.

New features of a device according to the invention involve that the system comprises at least one holding means adapted to hold one or more loops formed on the optical fibre, in a way where at least one loop may substantially freely change length when subject to a change in temperature, and where the at least one optical fibre is at least extending between the connecting means and the holding means, and where said at least one loop, which may substantially freely change length, is held by the holding means and comprises a part of the optical fibre, which comprises a number of reflecting structures, and where said optical fibre, the connecting means and the holding means are at least partly embedded in said fibre-reinforced part of said device.

When the holding means are adapted to hold one or more loops formed on the optical fibre, in a way where at least one loop may substantially freely change length when subject to a change in temperature, and that the loops are held by the holding means with said at least one loop comprising a part of the optical fibre, which comprises a number of reflecting structures, it is obtained that the at least one loop may be used to obtain a passive reference measurement, which is independent of any strain present in the part, whereby said reference measurement may be used for providing compensation for temperature change in an active strain measurement performed on said part. By the at least one optical fibre at least extending between the connecting means and the holding means, and the at least one loop, which may substantially freely change length, being held by the holding means and comprising a part of the optical fibre, which comprises a number of reflecting structures, it is obtained that the connecting means and the holding means may be placed independently, with the only limitation being the length of the optical fibre, which may be chosen freely. This may be used to place the holding means near an active strain gauge placed on the part, whereby the temperature of the strain gauge and the loop on the optical fibre comprising the number of reflecting structures may be substantially identical, and hence very accurate temperature compensation may be obtained for a strain measurement performed by that particular strain gauge. Since also the connecting means may be placed freely, it may be placed at any convenient position suitable for connecting light emitting and light receiving means. Such free placing is of significant advantage by large and/or elongated parts, such as blades for wind turbines, which have lengths longer than 30 meters and widths of more than 3 meters, and where strain gauges may be employed at any position. By at least partly embedding the optical fibre, the connecting means and the holding means are the fibre-reinforced part of said device, and the items are well protected and safely kept in place. It is also obtained that the temperature of the optical fibre and the fibre-reinforced part are at least nearly identical.

In one advantageous embodiment the system may comprise one connecting means adapted for connection of light emitting means and one connecting means adapted for connection of light receiving means to the optical fibre, where the optical fibre extends from one of the connection means to another via at least one holding means. This provides two connections to the optical fibre, which e.g. leave a spare connection in case the optical fibre should break on one side of the holding means, which will disable connection to and from one of the connection means to the at least one loop, which may freely change length.

A preferred embodiment may involve that the system comprises two or more holding means, where each holding means comprises at least one loop comprising a part of the optical fibre, which comprises a number of reflecting structures. It is hereby obtained that accurate temperature compensation may be performed for two or more strain measurements performed with strain gauges placed in different places on fibre-reinforced the part. This is advantageous especially for large parts where it may be desired to monitor strain in more than one location.

Another preferred embodiment may involve that an optical fibre enters the holding means in one direction and exits in another direction. The holding means may in this way be used for changing direction of the path in which the optical fibre is led, e.g. towards another holding means or connecting means. Free positioning of the holding means and the connecting means is thereby enhanced.

Other features of a device according to the invention are the subject of claims 4-12.

Other features of the invention involve a method for manufacturing a device comprising a fibre-reinforced part including a system adapted for use in temperature compensation of strain measurements, said system comprising at least one optical fibre as well as connecting means adapted for connection of light emitting means and light receiving means to the optical fibre, said optical fibre comprising a number of reflecting structures, where the system comprises at least one holding means adapted to hold one or more loops formed on the optical fibre, in a way where at least one loop may substantially freely change length when subject to a change in temperature, and where moulding means according to a predetermined shape of said device are provided as well as fibres for reinforcement and resin, where the method comprises independent steps of:

connecting the optical fibre with the connecting means, forming part of the optical fibre into one or more loops and holding said loops with the holding means, in a way where at least one loop is substantially free to change length when subject to a change in temperature, said at least one loop comprising a part of the optical fibre, which comprises a number of reflecting structures, applying the fibres for reinforcement, the optical fibre, the connecting means, the holding means and the resin on the moulding means and forming the device in a way where the optical fibre, the connecting means and the holding means are at least partly embedded in at least the resin.

By such a method a device may be manufactured, where said device involves corresponding functions and technical effects as the aforementioned device according to the invention. The method steps are independent, since the optical fibre may e.g. be connected to the connecting means and/or holding means before or after the connecting and/holding means are applied on the moulding means. The fibres for reinforcement may preferably be applied in a dry state along with the optical fibre, the connecting means and the holding means, where after the resin is infused in a state where air is evacuated, such as in a VARTM process (Vacuum Assisted Resin Transfer Moulding).

The method may preferably be performed in a way where the optical fibre is connected with the connecting means, and where a part of the optical fibre is formed into a number of loops, and holding said loops with the holding means, in a way where at least one loop is substantially free to change length when subject to a change in temperature, said at least one loop comprising a part of the optical fibre, which comprises a number of reflecting structures, and where the optical fibre is winded onto at least one spool before the optical fibre, the connecting means and the holding means are applied. The optical fibre, which is fragile, may hereby stay protected on the spool during storage and handling until it is actually used.

According to another preferred feature, the optical fibre may be applied from the spool and continuously fastened to the fibres for reinforcement while being unwinded. The optical fibre thus stays protected at all time.

Further features of the invention involve a system adapted for a device or a method according to any of claims 1-15, said system being adapted for use in temperature compensation of strain measurements and comprising at least one optical fibre as well as connecting means adapted for connection of light emitting means and light receiving means to the optical fibre, said optical fibre comprising a number of reflecting structures, wherein:

the system comprises at least one holding means adapted to hold one or more loops formed on the optical fibre, in a way where at least one loop may substantially freely change length when subject to a change in temperature, and where the at least one optical fibre is at least extending between the connecting means and the holding means, and where said at least one loop, which may substantially freely change length, is held by the holding means and comprises a part of the optical fibre, which comprises a number of reflecting structures.

Such a system is hereby suitable for use in a device and a method according to the invention, whereby functions and technical effects earlier mentioned may be obtained.

A preferred embodiment of the system involves that the system is assembled to form a ready-for-use kit, said kit comprising at least one spool onto which the optical fibre is winded. Such a kit is easy to handle and employ under normal manufacturing conditions for fibre-reinforced parts, where fibres and resin are used, and hence personnel has to wear personal protection equipment such as heavy gloves etc.

Preferred features of connecting means and holding means according to the invention are the subject of claims 18-23.

In the following the invention is described with reference to the drawings, which display examples of embodiments of the invention.

Figure 1:
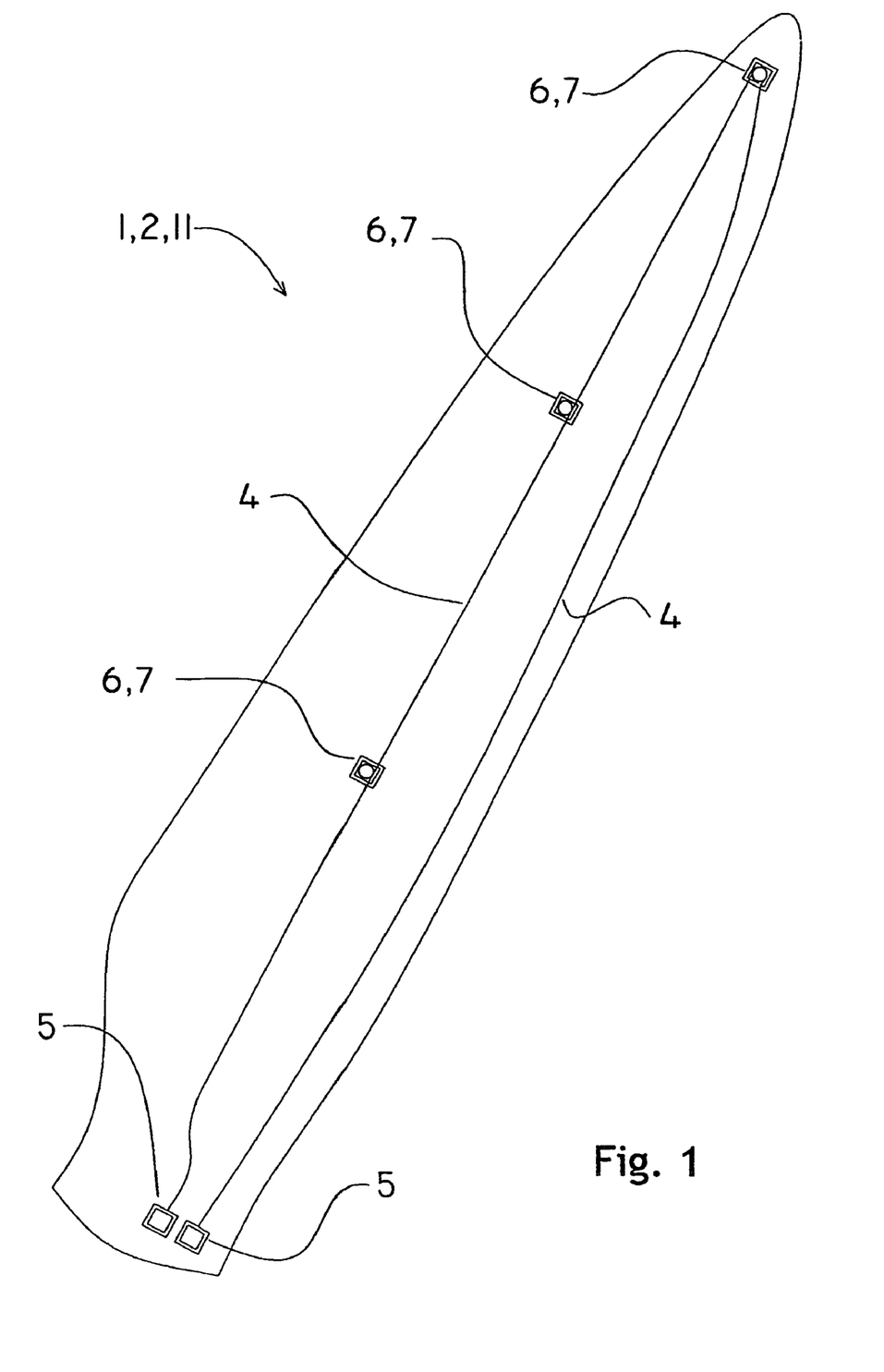
FIG. 1 shows one side of a device according to the invention.

FIG. 1 displays a device 1 comprising a fibre-reinforced part 2, where the device 1 in this example is a blade 11 for a wind turbine. Near the root of the blade 11 two connecting means 5 are placed, whereto an optical fibre 4 is connected. Between the connecting means 5 the optical fibre 4 is placed in three individual holding means 6, each holding one or more loops 7 formed on the fibre 4, said loops 7 including at least one loop, which may freely change length when subject to a change in temperature, and which includes a number of reflecting structures, such as Bragg gratings.

Figure 2:
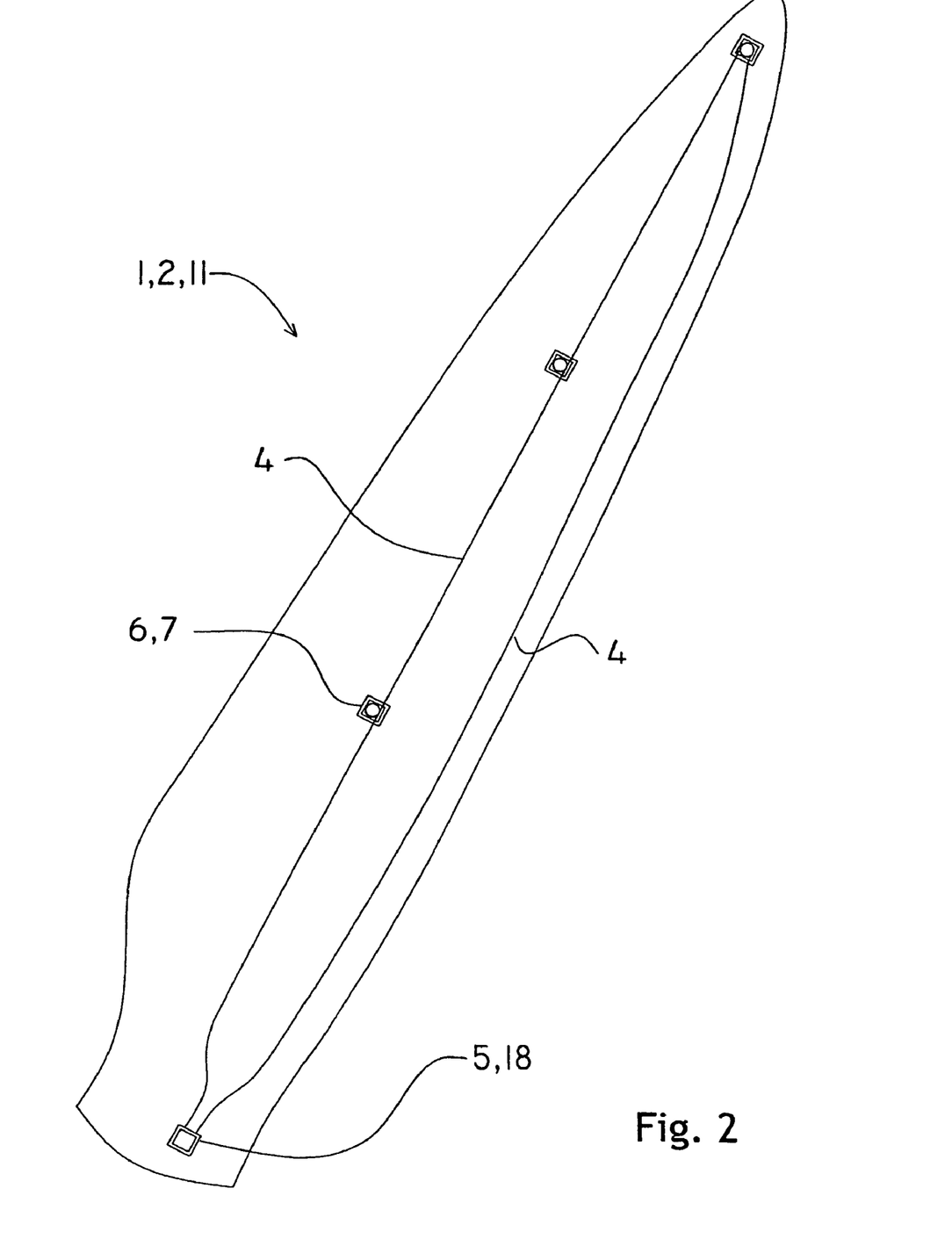
FIG. 2 shows one side of another device.

FIG. 2 displays a device 1 corresponding to FIG. 1, however having connecting means 5 being integrated in a common housing 18.

Figure 3:
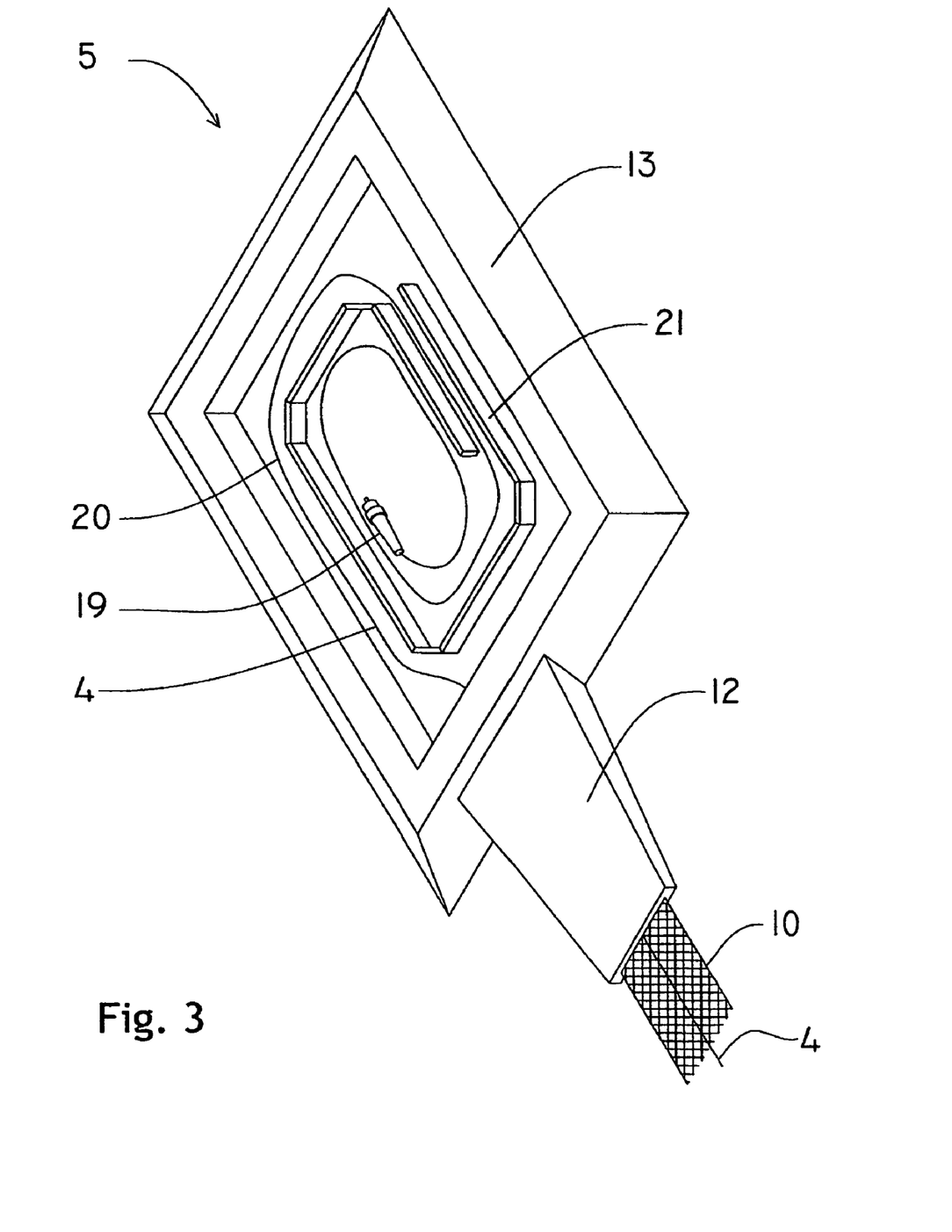
FIG. 3 shows an elevated view of connecting means.

FIG. 3 displays a particular embodiment of connecting means 5 including a housing 13, which has a general shape as a truncated pyramid. An optical fibre 4, which is supported by a string 10, is via a tapered, elongate and resilient portion 12 lead into a depression in the housing 13 and laid in a loop, which is fixated with resilient glue 20, and finally ending in a free loop having a plug 19 connected. The plug 19 is intended for connection to undisplayed light emitting and/or light receiving means. To ease forming of a loop on the fibre 4 and holding this in place while the glue 20 is curing, a wall 21 may be placed on the housing, or it may be machined or cast when the housing 13 is made. The housing 13 will in use be covered by e.g. a plate, preferably resting on an undisplayed seal to form a tight connection. When manufacturing a device, the connecting means 5 may the be placed on a moulding means with the undisplayed plate facing said moulding means, where after reinforcement fibres are placed around the connecting means 5 and resin introduced. After curing of the device, the plate will be facing a surface of the device and the connecting means 5 be accessed from an internal side by removing the plate.

Figure 4:
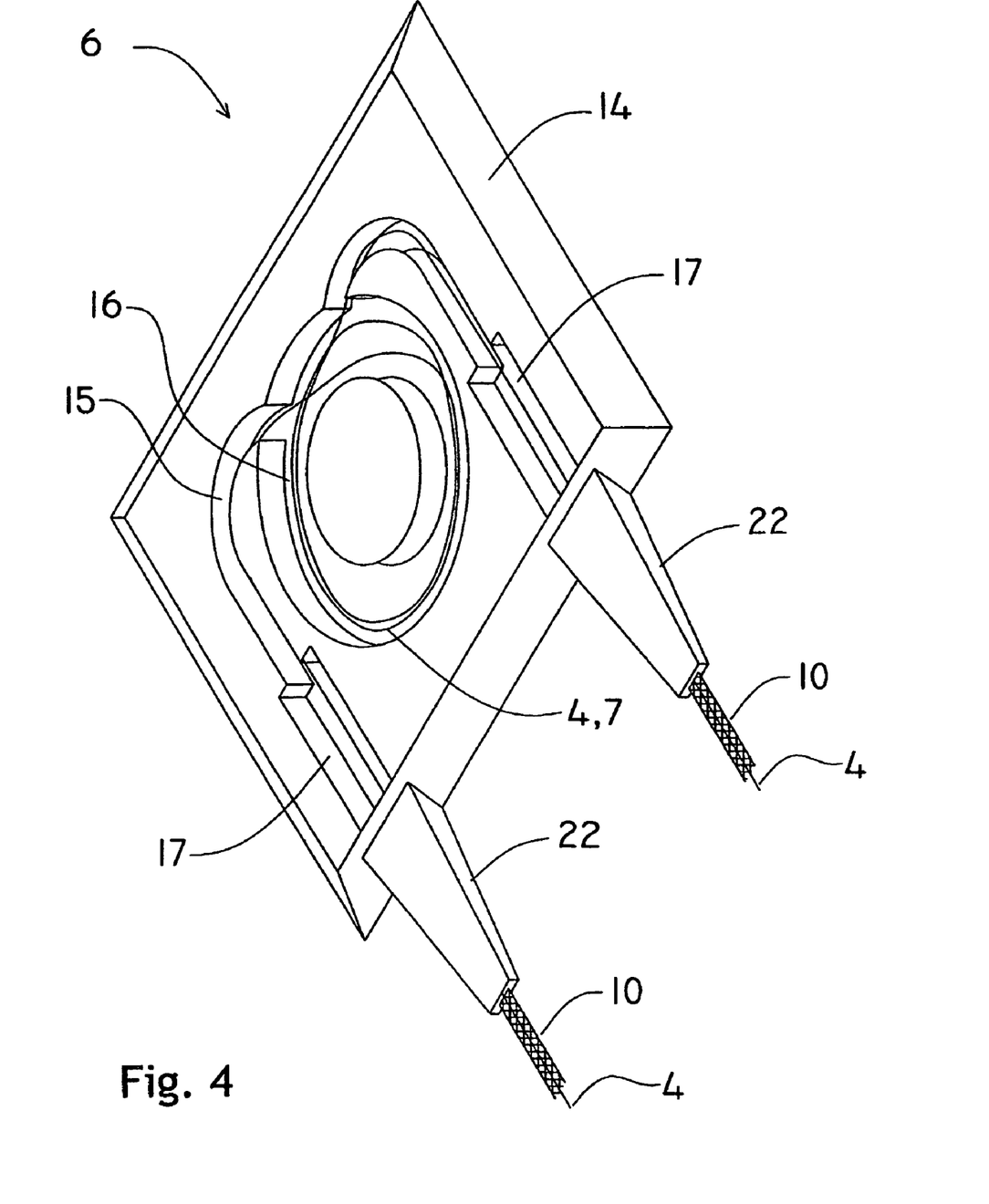
FIG. 4 shows an elevated view of holding means.

FIG. 4 displays holding means 6 comprising a housing 14 provided with a recess 15 including a circular path 16, which is connected to recesses 17. The circular path 16 is adapted to hold one or more loops 7 formed on an optical fibre 4, where at least one loop comprises a number of reflecting structures, such as Bragg gratings. The fibre 4 is fixed in the recesses 17 with resilient glue and enters and exits, respectively, the housing 14 via resilient portions 22. The fibre 4 may be supported by a string 10, e.g. made from woven or braided glass fibres. The loops 7 lay loose and have a slightly smaller diameter than the circular path 16, and may hence slide substantially without resistance, and are hence free to change length when subject to a change in temperature. The housing 14 may be closed with an undisplayed plate in a similar way as explained above with regard to the connecting means 5, and the holding means 6 may be placed in a similar way during manufacture to obtain internal access. Both the housings 13 and 14 may preferably be made from a polymeric material by processes involving casting, milling or the like.

Figure 5:
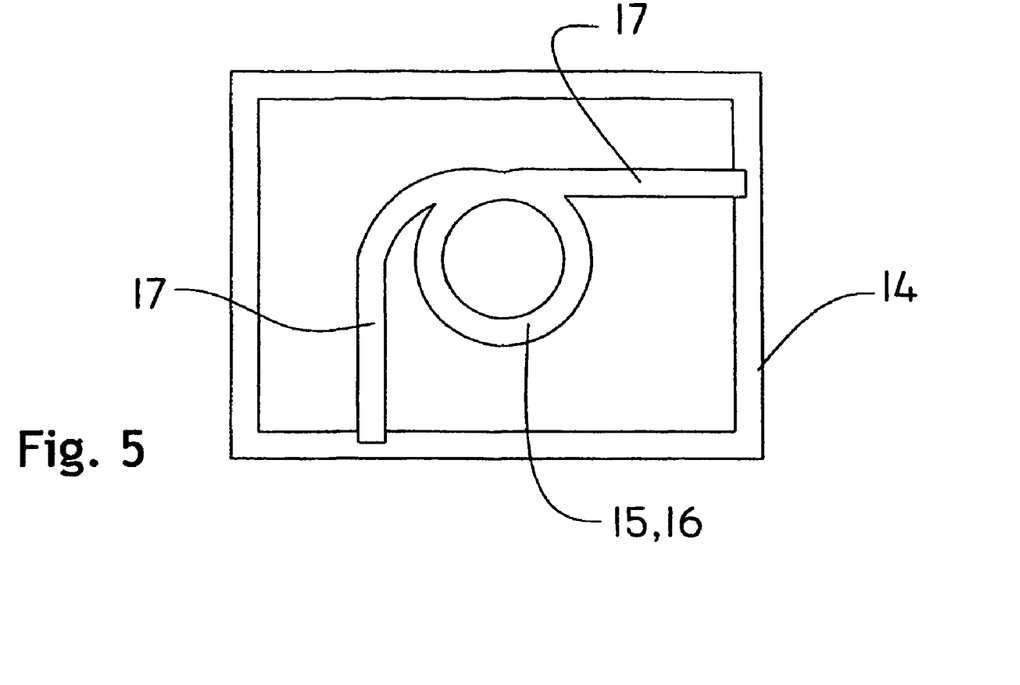
FIG. 5 shows a holding means seen from above.
Figure 6:
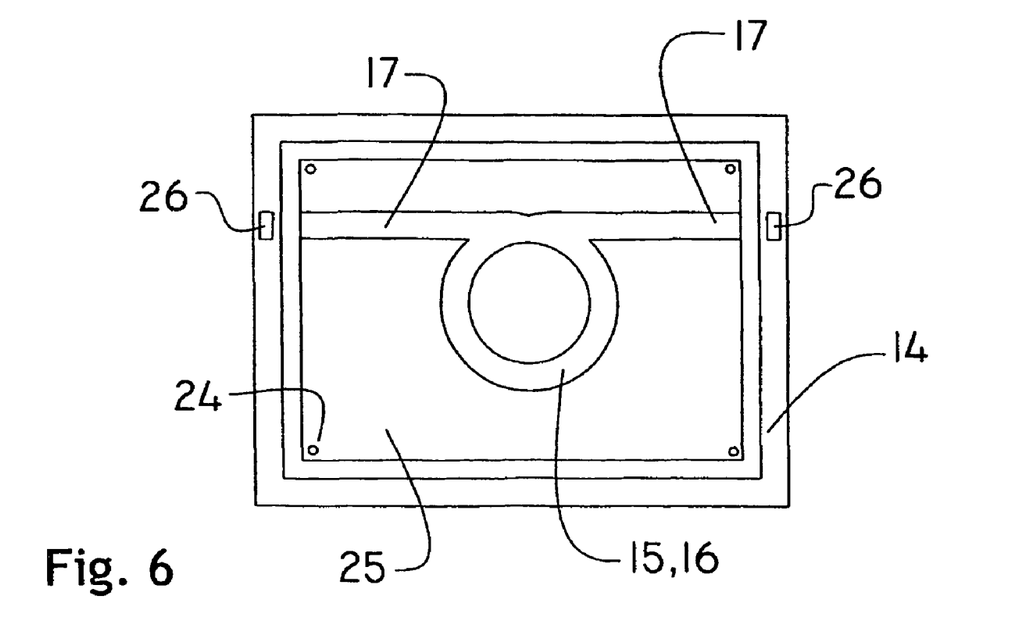
FIG. 6 shows another holding means seen from above

FIGS. 5 and 6 display a housing 14 comprising a recess 15 having a circular path 16 and two connecting recesses 17. As shown, the recesses 17 may be adapted to extend in different directions, whereby an undisplayed optical fibre placed in loops in the circular path 16 and exiting via the recesses 17 may be led in different directions. In FIG. 6 it is shown that the recesses 15, 17 and the circular path 16 may be placed in a depression 25, where they may be covered by an undisplayed plate and fixed with screws placed in holes 24. A fibre may enter and exit via holes 26.

Figure 7:
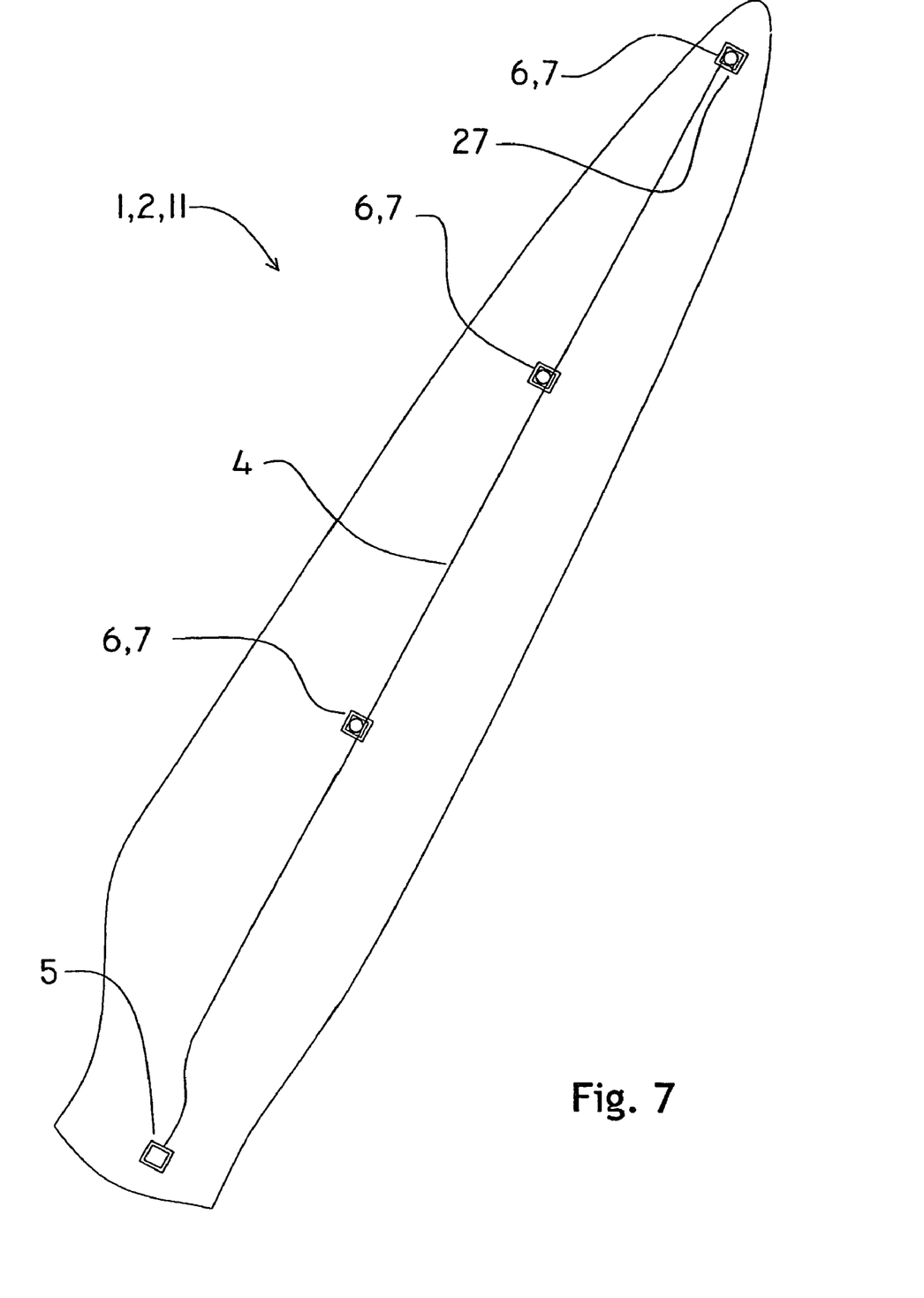
FIG. 7 shows one side of an alternative embodiment of a device

FIG. 7 displays a device 1 comprising a fibre-reinforced part 2, where the device 1 in this example is a blade 11 for a wind turbine. Near the root of the blade 11 one connecting means 5 is placed, whereto an optical fibre 4 is connected. From the connecting means 5 the optical fibre 4 is extending to holding means 6, and is here placed in three individual holding means 6, each holding one or more loops 7 formed on the fibre 4, said loops 7 including at least one loop, which may freely change length when subject to a change in temperature, and which includes a number of reflecting structures. At the farthest holding means 6 the fibre 4 ends in a free end 27.

Figure 8:
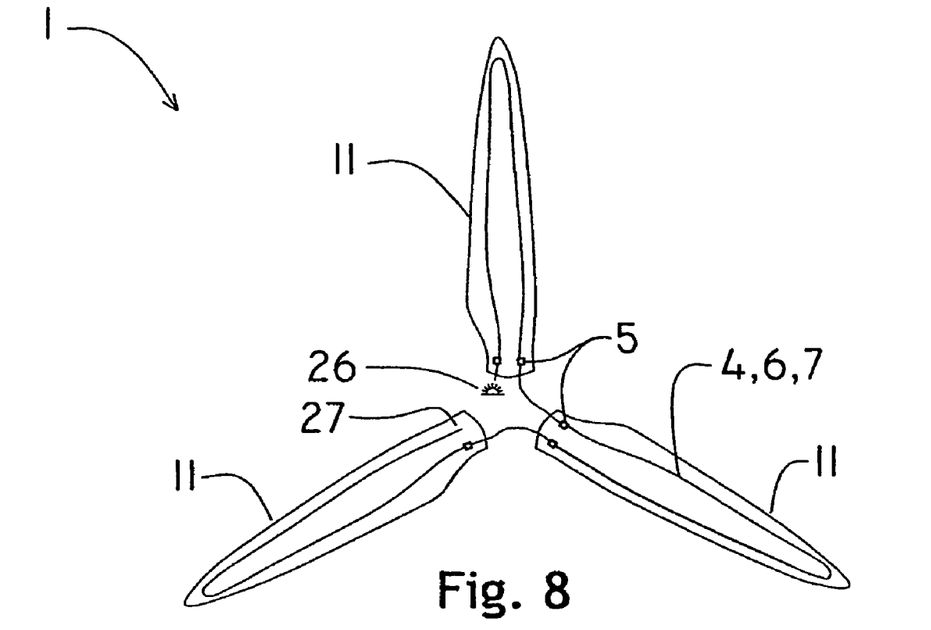
FIG. 8 shows a configuration of more devices for use in a wind turbine
Figure 9:
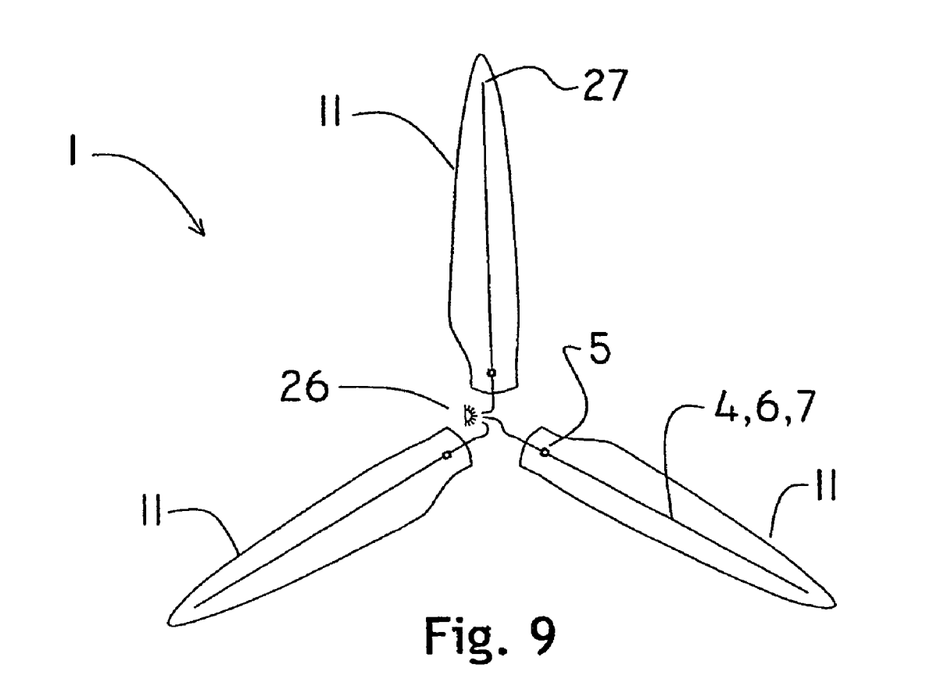
FIG. 9 shows another configuration of more devices for use in a wind turbine

FIGS. 8 and 9 each display a device 1 comprising three fibre-reinforced parts, which here are three blades 11 for a wind turbine. Optical fibres 4 are each led in a path in the blades 11. The optical fibres 4 are in FIG. 8 connected from blade to blade via connection means 5. The optical fibres 4 extend via non-displayed holding means 6, each holding one or more non-displayed loops 7 formed on the fibre 4, said loops 7 including at least one loop, which may freely change length when subject to a change in temperature, and which includes a number of reflecting structures. In FIG. 8 one fibre 4 ends in an end 27, which is not connected to connection means, whereas in FIG. 9 all three fibres 4 end in non-connected ends 27. In FIGS. 8 and 9 light emitting and light receiving means 26 are provided, by which light is emitted into the fibres 4, and some light is reflected by the reflecting structures, and is then received by the means 26.

As depicted in FIG. 3, the connecting means 5 comprise an elongate resilient portion 12, which portion is adapted to support an optical fibre 3 when connected to the connecting means.

The housing 13 of the connecting means 5 and/or the housing 14 of the holding means 6 may be provided with a shape, which is substantially frusto-conical or substantially like a truncated pyramid.

The housings 13, 14 of the connecting means 5 and the holding means 6 may be made from a polymeric material, whereby said means as well as the optical fibre 4 are made essentially without using any e.g. metallic parts to maintain a generally low risk of a lightning strike in said means, although the connecting means 5 may include metallic plugs 19 for connecting the optical fibre 4 to means for emitting and receiving light, respectively.

It is to be understood that the invention as disclosed in the description and in the figures may be modified and changed and still be within the scope of the invention as claimed hereinafter.

The invention claimed is:

1. A device comprising a fibre-reinforced part and including at least one system for use in temperature compensation of strain measurements, said system comprising an optical fibre as well as connecting means for connection of light emitting means and light receiving means to the optical fibre, said optical fibre comprising a number of reflecting structures, wherein
    the system comprises at least one holding means holding one or more loops formed on the optical fibre, in a way where at least one loop may substantially freely change length when subject to a change in temperature,
    and where the optical fibre is at least extending between the connecting means and the holding means,
    and where said at least one loop, which may substantially freely change length, is held by the holding means and comprises a part of the optical fibre, which comprises a number of reflecting structures,
    and where said optical fibre, the connecting means and the holding means are at least partly embedded in said fibre-reinforced part of said device.

2. A device according to claim 1, where the system comprises a first connecting means for connection of light emitting means and a second connecting means for connection of light receiving means to the optical fibre, and where the optical fibre extends from one of the connection means to another via at least one holding means.

3. A device according to claim 1, where the system comprises two or more holding means, and where each holding means comprises at least one loop comprising a part of the optical fibre, which comprises a number of reflecting structures.

4. A device according to claim 1, where the optical fibre enters the holding means in one direction and exits in another direction.

5. A device according to claim 2, where two connecting means are integrated in a common housing.

6. A device according to claim 1, where the connecting means are placed by a surface of said part and adapted to be accessible from an internal position within said part.

7. A device according to claim 1, where the optical fibre at least between the connecting means and the holding means is provided with support means for reinforcement of the fibre.

8. A device according to claim 7, where the support means include a string comprising woven or braided fibres, preferably glass fibres.

9. A device according to claim 8, where the optical fibre is fastened to the string with double coated tape.

10. A device according to claim 8, where the optical fibre is integrated in the string, preferably by weaving or sowing.

11. A device according to claim 1, where the connecting means and the holding means each comprise a recess, in which a part of the optical fibre is fastened with glue.

12. A device according to claim 1, where said part is a fibre-reinforced blade shell of a blade for a wind turbine.

13. Holding means adapted for a device, according to claim 1, where the holding means comprise a housing provided with at least one recess, said recess having at least one substantially circular path adapted for substantially surrounding loops formed on an optical fibre.

14. Holding means according to claim 13, where the substantially circular section is connected with at least two recesses.

15. Holding means according to claim 13, where the housing is provided with a shape, which is substantially frusto-conical or substantially like a truncated pyramid.

16. A method for manufacturing a device comprising a fibre-reinforced part including a system for use in temperature compensation of strain measurements, said system comprising an optical fibre as well as connecting means for connection of light emitting means and light receiving means to the optical fibre, said optical fibre comprising a number of reflecting structures, where the system comprises at least one holding means adapted to hold one or more loops formed on the optical fibre, in a way where at least one loop may substantially freely change length when subject to a change in temperature, and where moulding means according to a predetermined shape of said device are provided as well as fibres for reinforcement and resin, where the method comprises independent steps of:

connecting the optical fibre with the connecting means, forming at least one part of the optical fibre into one or more loops and holding said loops with the holding means, in a way where at least one loop is substantially free to change length when subject to a change in temperature, said at least one loop comprising a part of the optical fibre, which comprises a number of reflecting structures, applying the fibres for reinforcement, the optical fibre, the connecting means, the holding means and the resin on the moulding means and forming the device in a way where the optical fibre, the connecting means and the holding means are at least partly embedded in at least the resin.

17. A method according to claim 16, where the optical fibre is connected with the connecting means, and where a part of the optical fibre is formed into one or more loops, and holding said one or more loops with the holding means in a way where at least one loop is substantially free to change length when subject to a change in temperature, said at least one loop comprising a part of the optical fibre, which comprises a number of reflecting structures, and where the optical fibre is winded onto at least one spool before the optical fibre, the connecting means and the holding means are applied on the moulding means.

18. A method according to claim 17, where the optical fibre is applied from the spool and continuously fastened to the fibres for reinforcement while being unwinded.

19. A system for a device or a method according to any of the preceding claims, said system being for use in temperature compensation of strain measurements and comprising the optical fibre as well as the connecting means for connection of the light emitting means and the light receiving means to the optical fibre, said optical fibre comprising a number of reflecting structures, wherein the system comprises at least one holding means to hold one or more loops formed on the optical fibre, in a way where at least one loop may substantially freely change length when subject to a change in temperature, and where the optical fibre is at least extending between the connecting means and the holding means, and where said at least one loop, which may substantially freely change length, is held by the holding means and comprises a part of the optical fibre, which comprises a number of reflecting structures.

20. A system according to claim 19, where said system is assembled to form a ready-for-use kit, said kit comprising at least one spool onto which the optical fibre is winded.

21. Connecting means for the device, according to claim 1, where the connecting means are for connecting at least one of the light emitting means and the light receiving means to an optical fibre, said connecting means comprising a housing for storing and holding an end section of the optical fibre being formed with the at least one loop placed by said end section.

22. Connecting means according to claim 21, where the connecting means comprise an elongate resilient portion, which portion is adapted to support an optical fibre when connected to the connecting means.

23. Connecting means according to claim 21, where the housing is provided with a shape, which is substantially frusto-conical or substantially like a truncated pyramid.

* * * * *